(12) United States Patent
Murphy et al.

(10) Patent No.: US 6,698,657 B2
(45) Date of Patent: Mar. 2, 2004

(54) METHOD AND APPARATUS FOR DATA INTERPRETATION

(76) Inventors: Victor A. Murphy, 960 Rockybrook Dr., Columbus, GA (US) 31904; John T. Dunlap, 9406 Comamche Rd., Columbus, GA (US) 31904; Steven J. Drucker, 5025 Nesbit Ferry La., Atlanta, GA (US) 30350

( * ) Notice: Subject to any disclaimer, the term of this patent is extended or adjusted under 35 U.S.C. 154(b) by 290 days.

(21) Appl. No.: 09/793,004

(22) Filed: Feb. 26, 2001

(65) Prior Publication Data
US 2002/0014531 A1 Feb. 7, 2002

Related U.S. Application Data

(60) Provisional application No. 60/184,757, filed on Feb. 24, 2000.

(51) Int. Cl.[7] .............................. G06K 7/10; G06K 19/06
(52) U.S. Cl. ................... 235/462.03; 219/678; 219/679; 219/721; 219/749; 219/506
(58) Field of Search ....................... 235/462.03, 462.13, 235/375; 219/678, 754, 509, 620, 635, 664, 679, 201, 721, 506; 364/144, 143, 142

(56) References Cited

U.S. PATENT DOCUMENTS

| | | | | |
|---|---|---|---|---|
| 4,323,773 A | * | 4/1982 | Carpenter | 235/473 |
| 4,714,811 A | * | 12/1987 | Gerling et al. | 219/751 |
| 4,780,588 A | * | 10/1988 | Edamura | 219/714 |
| 4,816,635 A | * | 3/1989 | Edamura | 219/714 |
| 4,945,216 A | * | 7/1990 | Tanabe et al. | 235/462.15 |
| 4,983,815 A | | 1/1991 | Kumasaka | |
| 5,285,041 A | * | 2/1994 | Wright | 219/717 |
| 5,321,232 A | * | 6/1994 | Ogle | 219/506 |
| 5,395,181 A | * | 3/1995 | Dezse et al. | 400/103 |
| 5,426,280 A | | 6/1995 | Smith | |
| 5,486,685 A | * | 1/1996 | Dodds | 219/720 |
| 5,724,244 A | * | 3/1998 | Yabuki | 705/400 |
| 5,798,514 A | * | 8/1998 | Domanik | 235/462.03 |
| 5,994,683 A | * | 11/1999 | Braunisch et al. | 219/704 |
| 6,124,583 A | * | 9/2000 | Bowers | 219/714 |
| 6,382,514 B1 | * | 5/2002 | Chung | 235/462.38 |

FOREIGN PATENT DOCUMENTS

JP  2000104927 A  *  4/2000  ............. F24C/7/02

* cited by examiner

Primary Examiner—Karl D. Frech
Assistant Examiner—Daniel I. Walsh
(74) Attorney, Agent, or Firm—Patent Focus, Inc; Richard C. McComas (57) ABSTRACT

An interactive interpreter of synchronous or asynchronous selective data from an annular indicia. The annular indicia has data contained thereon that is formatted into bit-cells. The bit-cells are angularly positioned about the circumference of the annular indicia. The annular indicia may, if desired, be rotated in the clockwise or counterclockwise direction enabling the interpretation of data encoded as bit-cells. A controller with memory, the memory having stored therein a software program that provides interpretation of the data contained on the annular indicia and the directional rotation of the data. The rotation of the annular indicia may, if desired, be started and stopped at any convenient time without loss of data or reinterpreting of data. The data contained on the annular indicia may, if desired, be selectively disposed about the circumference of the annual indicia.

12 Claims, 13 Drawing Sheets

Table 1

METHOD AND APPARATUS FOR DATA INTERPRETATION

CROSS-REFERENCE TO RELATED APPLICATION

This application claims the benefit of U.S. Provisional Application Ser. No. 60/184,757, filed on Feb. 24, 2000, which is incorporated by reference herein.

FIELD OF THE INVENTION

The present invention relates, in general, to a system for interpreting data from the surface of a geometrically shaped object. In particular, the present invention relates to a method and apparatus for processing data received from the surface of a geometrically shaped object, the object being disposed on a synchronistically rotatable platform operationally disposed to a controller.

BACKGROUND OF THE INVENTION

In general, the transfer of energy to a physical, chemical, or thermodynamic process stream is determined by the work performed on that process. For example, the present day microwave oven transfers energy to a specimen contained within the confines of the microwave oven by bombarding the specimen with electromagnetic waves causing molecules in the specimen to vibrate billions of times per second. Heat is created when dipolar molecules (such as water) vibrate back and forth aligning themselves with the electric field or when the ions migrate in response to the electric field. The vibrations cause heat by friction at a depth of about 1 to 1.5 inches. Heat transfer properties of the specimen continue the process of thermal transfer by transmitting heat to areas of the specimen that are relatively cool in comparison to the areas that have been heated by the electromagnetic waves. The measure of work performed on the specimen is determined by power received by the specimen multiplied by time (W+P * T).

Mechanisms that provide the microwave oven data to ascertain the estimated power and time are well known in the art. Examples of such mechanisms are delineated in U.S. Pat. Nos. 5,812,393 and 5,883,801. Once the data is received by the microwave oven, the data is transformed into commands that are discernible by a controller disposed within the microwave oven. Generally, the controller is a computer or microprocessor based system. The computer or microprocessor has stored within its memories at least one program to facilitate the operation of the microwave oven.

Generally, the data received by input mechanisms is directed to the microwave oven's controller for processing. For example, a user may physically input codes or numbers into an input mechanism or keypad associated with the microwave oven. The code represent cooking instructions for the controller. Another example of transferring coded cooking instructions to the microwave oven's controller is by optical means. The user passes a wand or scanner over the cooking instruction's barcode imprinted on the surface of the cooking specimen or object to receive work and that data is transferred to the microwave oven's controller for processing.

Prior to the present invention, attempts to implement a more hands free approach to the control of a microwave oven have relied on user intervention to transfer data to the microwave oven's controller for processing via optical wands and scanners. This approach limits the flexibility of the data transfer to the microwave oven's controller. Scanning long data code strings in the form of a barcode is not practical from a user's perspective. Scanning barcodes is fraught with miss-readings due to the scanning techniques employed by the user. In the case of long data codes, the user would have to make multiple scans of different barcodes or continuously scan a single long barcode. Requiring a user to scan multiple barcodes or scan long data content barcodes does not lend itself to a total hands free environment for entering cooking instructions into a microwave oven.

To aid the reader in understanding the terms used throughout the text, drawings, and claims the following definitions are provided:

1) Barcode: A linear representation of data; read by a barcode scanner in one uniform direction.
2) Scanning barcodes: Reading or interpreting a barcode in a linear uniform direction.
3) Synchronous transmission of data: data being transmitted referenced to a particular transmission interval of time.
4) Asynchronous transmission of data: Translated data not being referenced to a particular transmission interval of time e.g., asynchronous data is converted to synchronous data once received by a receiver of the data transmission. Asynchronous transmission of data is defined to be of selective or varying start times for synchronous data.

It would be desirable to have an apparatus for transferring data from the surface of a package or object requiring no user intervention. The apparatus would control the seamless transfer of data and would not rely on the linear scanning of barcodes. The apparatus would encapsulate a controller for providing the mechanisms for controlling the physical, chemical, or thermodynamic process stream for transferring energy to the object or package.

SUMMARY OF THE INVENTION

The present invention is an interactive interpreter of synchronous or asynchronous selective data from an annular indicia. The annular indicia has data contained thereon that is formatted into bit-cells. The bit-cells are angularly positioned about the circumference of the annular indicia. The annular indicia may, if desired, be rotated in a clockwise or counterclockwise direction enabling the interpretation of data encoded as bit-cells.

The present invention has a controller with memory, the memory having stored therein a software program or data structures that interpret the data contained on the annular indicia and the directional rotation. The rotation of the annular indicia may, if desired, be started and stopped at any convenient time without loss of data or reinterpretation of data. The data contained on the annular indicia may, if desired, be selectively disposed about the circumference of the annual indicia. The present invention enables a user to transfer energy or work to a physical object, chemical, or thermodynamic process stream in a virtually hands free environment.

When taken in conjunction with the accompanying drawings and the appended claim, features and advantages of the present invention become apparent upon reading the following detailed description of the embodiments of the invention.

BRIEF DESCRIPTION OF THE DRAWINGS

The invention is illustrated in the drawings in which like reference characters designate the same or similar parts throughout the figures of which.

DETAILED DESCRIPTION OF THE INVENTION

Before describing in detail the particular improved annular indicia interpreter in accordance with the present invention, it should be observed that the invention resides primarily in a novel structural combination of conventional data/signal processing components, associated communication circuits, the command and control of the aforementioned components and circuits, and not in the particular detailed configuration thereof. Accordingly, the structure, command, control, and arrangement of these conventional components and circuits have, for the most part, been illustrated in the drawings by readily understandable block diagram representations. The drawings show only those specific details that are pertinent to the present invention in order not to obscure the disclosure with structural details which will be readily apparent to those skilled in the art having the benefit of the description herein. For example, a typical microwave oven 15, FIG. 1 has a turntable 12, FIG. 2a, a turntable drive motor 13, FIG. 2a, a power supply or module 14 that powers the turntable 12, and numerous connections to a keypad 16, FIG. 1. Various portions of the interconnection of the microwave oven 15 to the keypad 16 and the turntable 12 have been simplified in order to emphasize those portions that are most pertinent to the invention. Thus, the block diagram illustrations of the Figures do not necessarily represent the mechanical structural arrangement of the exemplary system, but are primarily intended to illustrate major software and hardware structural components of the system in a convenient functional grouping whereby the present invention may be more readily understood.

Figure 2A:
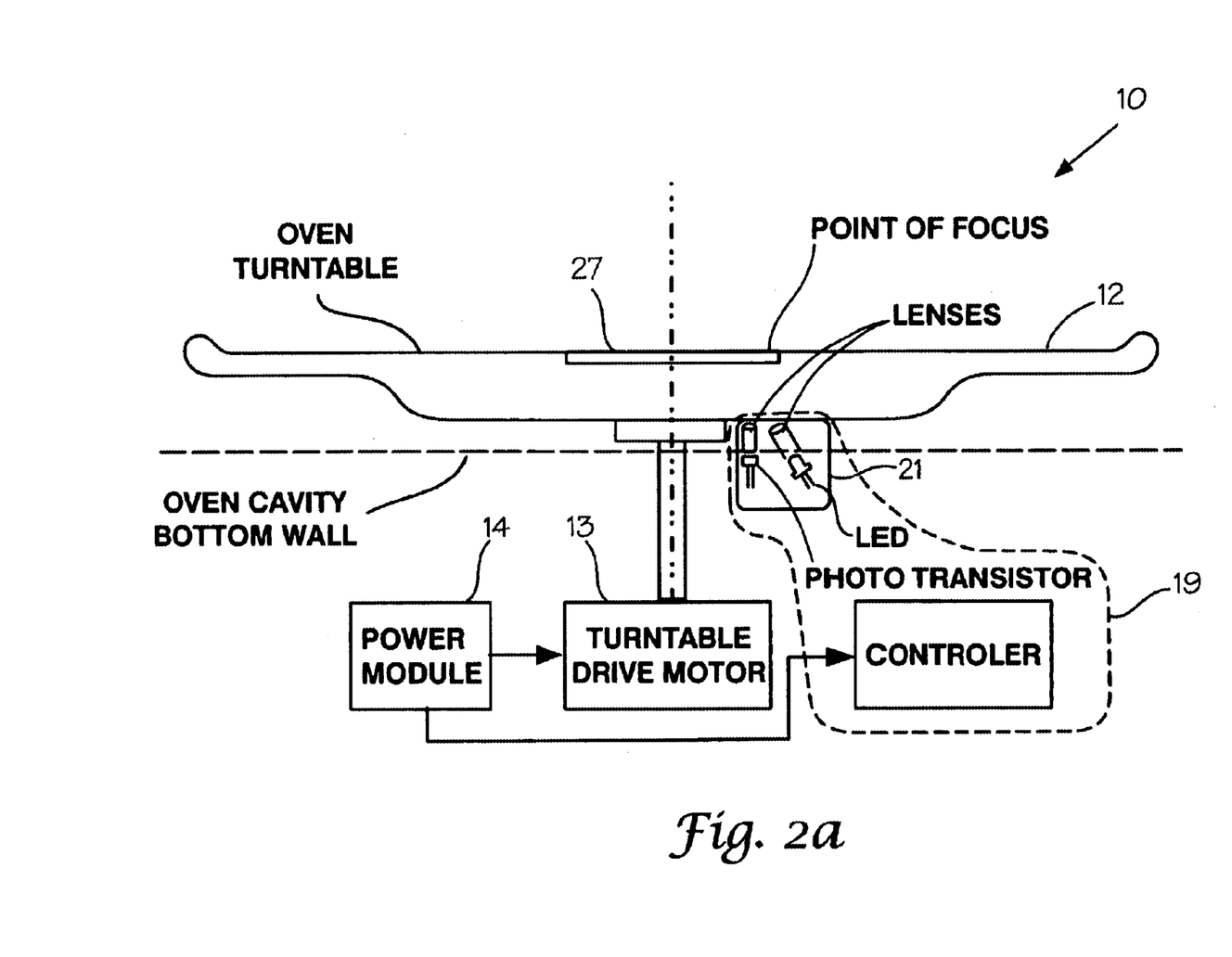
FIG. 2a illustrates a top-level schematic view diagram of a microwave oven turntable with the preferred embodiment of the present invention.

An overview of the preferred embodiment of the present invention: The present invention 10, FIG. 2a is a system for interactively interpreting data contained on an annular indicia. The annular indicia contains data, information, or at least one externally derived predetermined code pertinent to a micro-controller 19 to control the cooking of food or to perform a chemical, physical, or thermodynamic process in any of a plethora of variously sized host microwave ovens or disparate process streams in response to the data contained on the annular indicia. For example, a typical externally derived predetermined code that commands and controls a host microwave oven is delineated in U.S. Pat. No. 5,883,801 which is incorporated herein by reference. The present invention 10 enables the user of the host microwave oven or process stream to functionally operate the oven in a virtually hands free environment.

Figure 1:
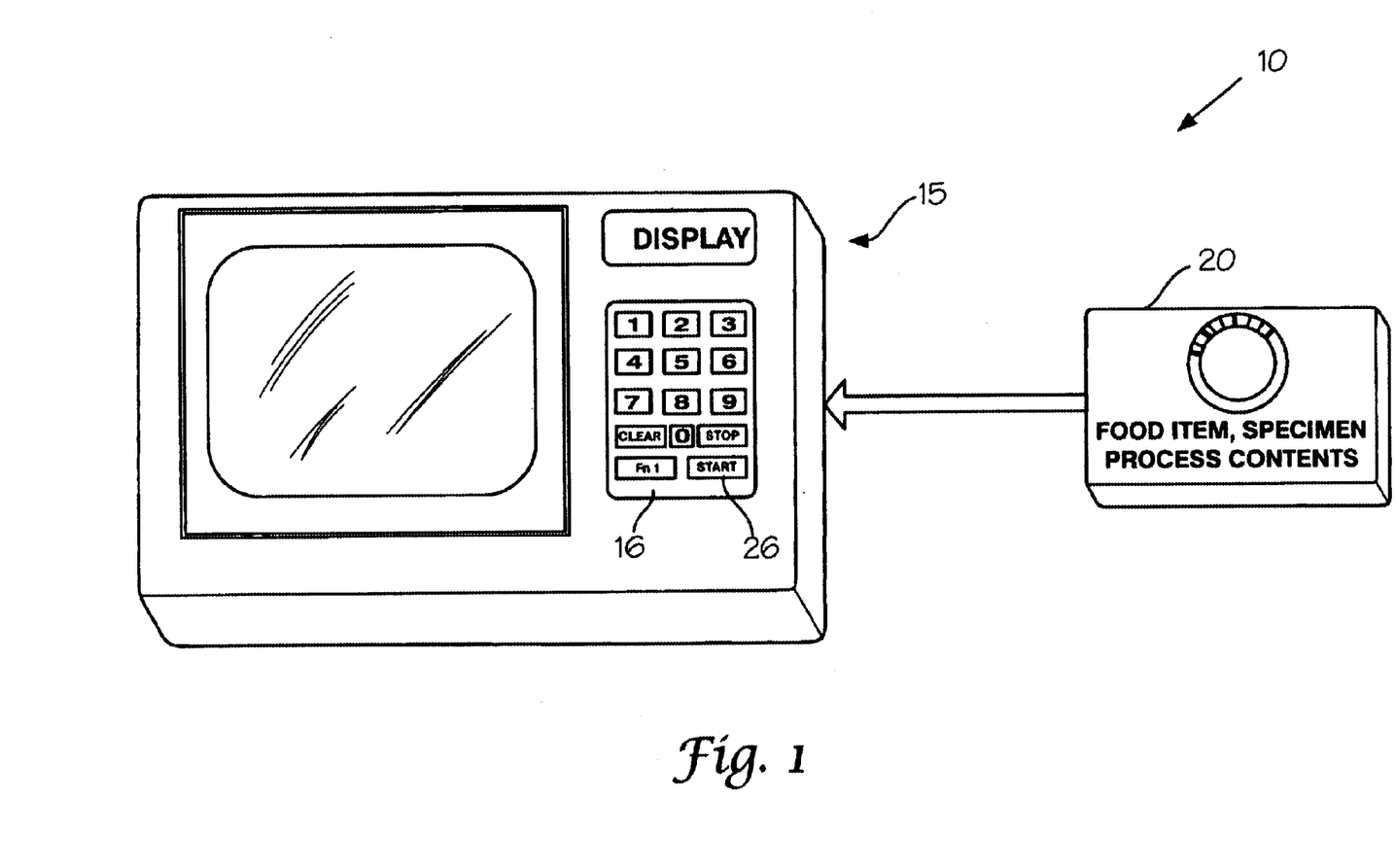
FIG. 1 illustrates a top-level schematic view diagram of the preferred embodiment of the present invention and a microwave oven.

The user places an object 20, FIG. 1 within the confines of a host microwave oven 15. The object 20 and the host microwave oven 15 contain the present invention 10. The data entry mechanism 16 is connected to the micro-controller 19 which receives commands from a start button 26. The user presses the start button 26 which activates the host microwave oven 15 and the present invention 10. The annular indicia is received, interpreted, processed, and transformed by the present invention 10 into an externally derived predetermined code containing at least one instruction set as delineated in U.S. Pat. No. 5,883,801. The micro-controller 19 receives and interprets the externally derived predetermined code into functional commands for the host microwave oven 15. The host microwave oven 15 receives the functional commands and begins performing work (Work=Power×Time) on the object 20 disposed within the confines of the host microwave oven 15.

Structural components of the present invention 10: The present invention 10, FIG. 2a is an asynchronous or synchronous (as defined in the Background Of The Invention) annular code interpreter. The present invention 10 comprises, in part, the controller 19 and at least one annular indicia 18, FIG. 3 imprint on the surface of any geometrically shaped object 20. The geometrically shaped object 20 is illustrated as a rectangle but if desired, the shape could be round, square, oval, or any type of conic section.

The micro-controller 19, FIG. 2a may, if desired, be installed, implemented, or connected internally or be externally connected to any rotational device containing the present invention 10. For example, micro-controller 19 is connected to the host microwave oven 15, FIG. 1. An example of micro-controller 19 is PIC 12C672 microprocessor, manufactured by Microchip, Inc. If desired, the micro-controller 19 may be incorporated into the existing host microwave oven's 15 micro-controller (not shown). The micro-controller 19 has at least one photo-transceiver module 21 interactively connected thereto. The transmitter portion of photo-transceiver module 21, under the direction of the micro-controller 19, transmits a variable color and variable intensity light beam to the surface of the geometrically shaped object 20 in such a way as to be incident to the annular indicia 18. The photo-beam may, if desired, be modulated, pulsed, continuous, or in steady state. The pulse format of the photo-beam may, if desired, be singularly transmitted or grouped in a pulse train.

The receiver portion of the photo-transceiver module 21, FIG. 2a receives the light reflected from the surface of the geometrically shaped object 20. The received light contains encoded data or information imprinted within the annular indicia 18. The data is transmitted to the micro-controller 19 for processing.

Figure 2B:
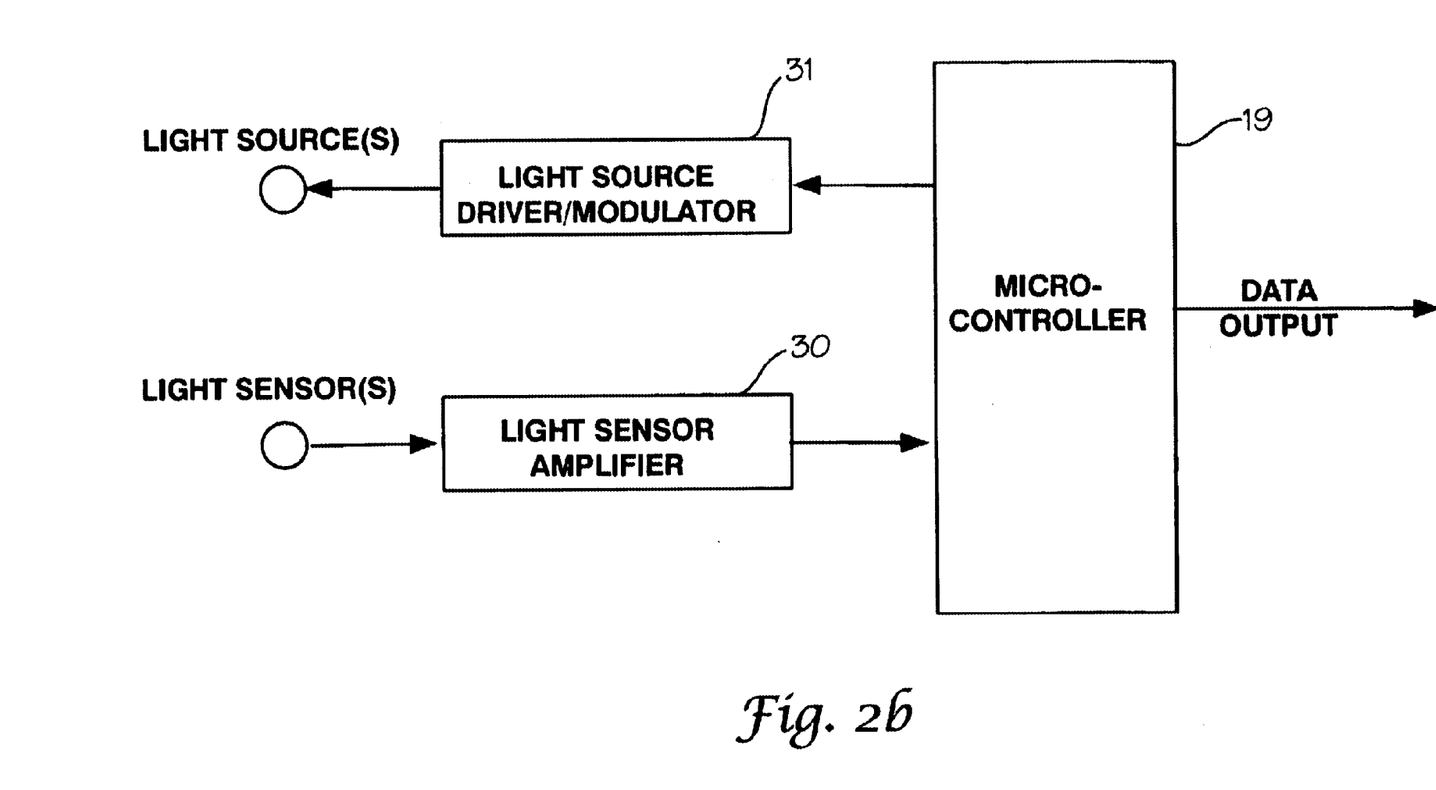
FIG. 2b illustrates a top-level schematic view diagram of a micro-controller of FIG. 2a FIG. 3 illustrates a schematic view diagram of an annular indicia imprint onto the surface of the object.

The photo-transceiver's 21, FIG. 2a transmitter portion may, if desired, be a photo-driver 31, FIG. 2b that is connected to the photo-emitter. An example of a photo—emitter is a light emitting diode (LED) The receiver portion of the photo-transceiver 21 may, if desired, be a photosensitive device 30, FIG. 2b that receives the light reflected from the surface of the annular indicia 18. An example of a photosensitive device is a photo-transistor. The light driver 31 receives an automatic gain control signal (AGC) from a microprocessor-based micro-controller 19. The AGC signal varies the intensity of the light driver 31 relative to the received light intensity from the photosensitive device 30. The AGC signal is relatively dependent on the position occurrence of the turntable 12. The micro-controller 19 determines from the photo-transceiver 21 data when and with what intensity a particular or selected segment of the annular indicia 18 is to be exposed to the light. The determination process begins with the micro-controller 19 rapidly scanning the color spectrum and evaluating the results from the photo-transceiver 21. When an expected color is received in the proper intensity, the revolutions of the turntable 12 are calculated relative to the expected color. This calculation synchronizes the data contained in the annular indicia 18 with the velocity of the turntable 12 thereby the micro-controller 19 can predict when the next expected color is to be transmitted. The expectant color signals are transformed from an analog to digital converter for processing by the micro-controller 19. The microprocessor implemented in this embodiment of the present invention 10 may, if desired, be the same as the microprocessor implemented in U.S. Pat. No. 5,883,801.

The data received by the micro-controller 19, FIG. 2a may, if desired, be pulsed, continuous, or asynchronously transmitted. All data transmitted to the micro-controller 19 is analyzed over an extended period of time to determine the operating characteristics of the drive motor 13 and turntable 12. Typically, turntables and drive motors degrade in performance as they age causing work performance problems on the geometrically shaped objects disposed within the confines of the microwave oven 15. The micro-controller 19 continuously monitors the overall performance of the drive motor 13 and turntable 12 to reduce or remove perturbations from the received encoded data. Known perturbations and anomalies that may cause skewing of encoded data are subtracted or adjusted from the encoded data by the micro-controller 19.

The turntable 12, FIG. 2a may, if desired, be manufactured from any type of material that permits electromagnetic energy to unobstructively traverse therethrough. An example of a suitable turntable 12 manufacturing material is optically pure glass. The turntable 12 may, if desired, have an indexing indentation 27 positioned anywhere on its surface. The indexing indentation 27 is sized to receive the annular indicia 18 disposed on the surface of the geometrically shaped object 20 in a suitable position for reading. For example, the indexing indentation 27 is concentrically positioned over the spindle of the drive motor 13. As the drive motor 13 revolves, the annular indicia 18 moves about the center axis of the drive motor 13.

Figure 3:
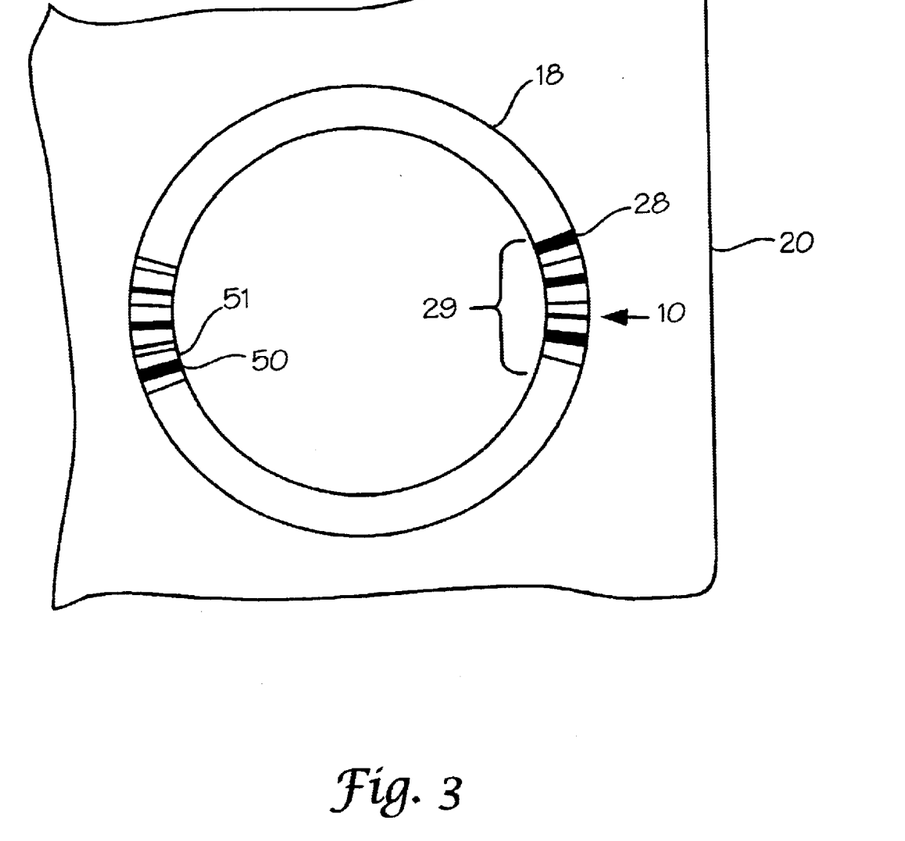

The annular indicia 18, FIG. 3 imprinted or otherwise disposed on the surface the geometrically shaped object 20 may, if desired, contain any type of symbol that is interpretable by the present invention 10. An example of a symbol is a bar 28 angularly positioned relative to the geometric center of the annular indicia 18. For example, bar 28 may, if desired, be trapezoidally shaped. The bars of the annular indicia 18 may, if desired, be multi-colored thereby expanding the data storage capabilities of the annular indicia 18. Examples of colors are black, white, red, blue, green or any other spectral discernable colors. The photo-transceiver 21 receives all or a substantial portion of the light reflected from the surface of the annular indicia 18 The micro-controller 19, by respectively scanning the color spectrum of the present invention 10, discerns the color of the individual bars of the annular indicia 18.

If desired a plurality of bars 29, FIG. 3 may be used as symbols. The spacing of the bars may be on one degree centers relative to the center of the geometrically shaped object 20 or the center of the indicia 18. The space between the bars may also contain data pertinent to performing the work function of the geometrically shaped object 20 disposed within the confines of the microwave oven 15. The spacing between the bars may, if desired, be divided into sections of various widths and these sections may represent discrete data.

Integration of the turntable drive motor 13, FIG. 2a and the annular indicia 18, FIG. 3: The symbols imprinted or affixed to the annular indicia 18 are distributed about its circumference. The symbols may, if desired, be bar-like in geometry. The color of the symbols are contrasting i.e., they may, if desired, be any two different discernable colors. For example, color symbol 50, FIG. 3 has a bar-like appearance and is black. Contrasting color symbol 51 has a bar like appearance and is white. If desired a plurality of contrasting color symbols may be imprinted or affixed about the circumference of annular indicia 18. The symbols of the annular indicia 18 are grouped in pairs i.e., black symbol 50 is adjacently spaced to white symbol 51. Each pair of symbols or one bit-cell has encoded therein one binary bit of information or data. There being an integer number of bit cells of equal angular displacement around the circumference of the annular indicia 18 each bit cell is of fixed angular width. The actual number of bit-cells disposed about the circumference of the annular indicia 18 is selectable. For continuous reading of the data contained in the annular indicia 18 a continuous array of bit-cells are disposed about the circumference of the annular indicia 18. If limited repetition of data is desired, a selectable number of bit-cells may be disposed about the circumference of the annular indicia 18. For example, if 360 bit-cells are desired about the circumference of the annular indicia 18 each would be on 1° (degree) centers i.e., each having equal angular displacement of 1° (degree).

Figure 6:
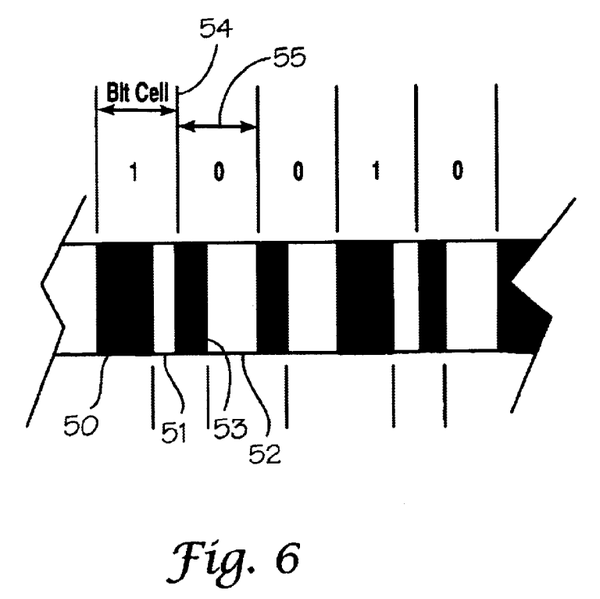
FIG. 6 illustrates a linear representation schematic diagram of the circular view of a bit-cell of FIG. 3.

Interpreting the data content of bit-cells: If a selected color of symbol is wider (given the direction of rotation) than its sequentially adjacent selected colored symbol, by definition the bit-cell represents a binary one. Conversely, if a given color of a symbol is smaller (given the direction of rotation) than its sequentially adjacent colored symbol, by definition the bit-cell represents a binary zero. For example, bit-cell 54, FIG. 6 comprises two symbols, black symbol 50 and white symbol 51. The black symbol 50 is wider than its sequentially adjacent white symbol 51 i.e., the data content of the bit-cell 54 is a binary 1. Conversely, the white symbol 52 is wider than its sequentially adjacent black symbol 53 i.e., the data content of the bit-cell 55 is a binary zero. This process of interpreting the width of each symbol within a bit-cell by the present invention 10 continues the collection of the encoded data of all the bit-cells disposed about the circumference of the annular indicia 18. The sum of the widths of the black and white symbols comprising the bit-cells is constant and equal to the bit-cell angular displacement i.e., the beginning and end points of each of the bit-cells are the same. The location of the transition from white to black or black to white within a given bit cell is not constant and varies with the data encoded in the bit-cells.

Interpretation of indicia data: The annular indicia 18, FIG. 3 is interpreted by the micro-controller 19. The micro-controller 19 is in communication with the power module 14. The micro-controller 19 receives rotational or synchronous rotational data from the power module 14. The micro-controller 19 in concert with the power module 14 determines the direction or rotation of the turntable 12 i.e. clockwise rotation or counterclockwise rotation. The present invention 10 is directionally independent of the movement of the turntable 12. The data received from the annular indicia 18 may be interpreted in the forward, reverse, clockwise, or counterclockwise direction.

The power module 14, FIG. 2a has a synchronous motor supplying the required drive force to rotate the turntable 12. The motor's drive force rotates synchronously with the line frequency of the AC power being supplied. The turntable 12 rotates at a fixed angular displacement with each cycle of the AC power. The relative angular position of the turntable may, if desired, be determined by monitoring the number of AC power cycles delivered to the motor in a selected period of time. A typical technique for measuring high resolution angular displacement of the turntable is measuring or detecting a single AC power cycle which can be subdivided into an integer number of evenly divided cycles of a higher frequency derived from the AC power line frequency. A method to generate a derived higher frequency that is an integer multiple of the AC line frequency is by means of a software based phased locked loop. If, for instance, the turntable revolves one rotation in 600 AC line cycles, and the derived higher frequency is 100 times the AC line frequency, then each cycle of the derived higher frequency would denote a turntable angular displacement of 360/(600× 100) or 0.006 degrees. By counting the number of cycles of the higher frequency during the period of time when the photo-transceiver 21 senses a black or white symbol, the angular width of the symbol can be measured.

When the interpretation of the data content of the annular indicia 18, FIG. 3 begins, the direction of rotation of the turntable 12, FIG. 2a is not initially known. If the turntable 12 is turning in a clockwise direction, bit-cells begin with the photo-transceiver module 21 detecting a black to white transition. Conversely, if the turntable 12 is rotating in a counterclockwise direction, bit cells begin with the sensor detecting a white to black transition. Since the beginning (and end) of a bit cell is synchronous with the rotation of the turntable motor, and the data transition within the bit-cell is not, it is possible to compare the fling of the color transitions with the turntable's 12 drive motor angular position as determined from the frequency and phase of the power being supplied to the drive motor. If the transitions from black to white more closely follows the expected angular position of the turntable than the white to black transitions, the turntable is rotating in a clockwise direction. Conversely, if the transitions from white to black more closely follows the expected angular position of the turntable than the black to white transitions, the turntable 12 is rotating in a counterclockwise direction.

Any method for determining the starting color of a bit-cell may be used. For example, the angular width of each bit-cell is selected as discussed herein. The angular width is fixed and constant. The data encoded within a bit-cell causes the angular width of respective colors to change or vary within the bit-cells. If one measures the angular width from the start of a black symbol to the start of the next black symbol for a statistically significant number of black symbols and calculates the standard deviation of the angular widths sampled, a determination of the regularity of spacing of the start of black symbols can be determined.

The same analysis as discussed above may be applied to white symbols. It will be found that one color will be more regularly spaced as its standard deviation is less than the opposite color. The color found to be more regularly spaced then signifies the starting color of the bit-cells and the direction of rotation of the turntable. When the direction of rotation of the turntable 12 has been determined, the proper color transition that marks the beginning of the bits-cells is known and reading of the encoded data may begin.

Figure 9A:
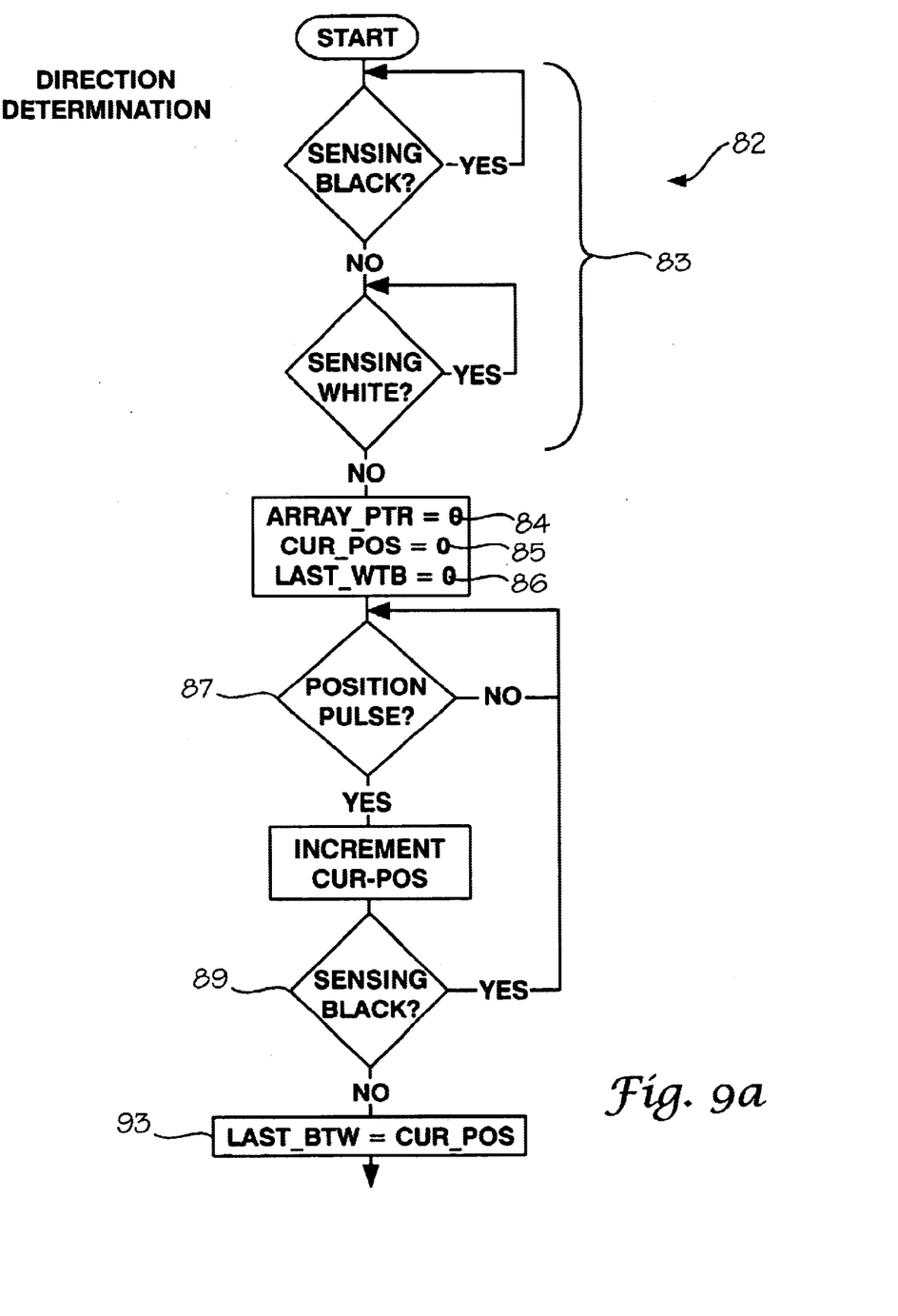
FIG. 9a illustrates a top-level flowchart depicting the logical determination of the directional rotation of the turntable, (Part A)
Figure 9B:
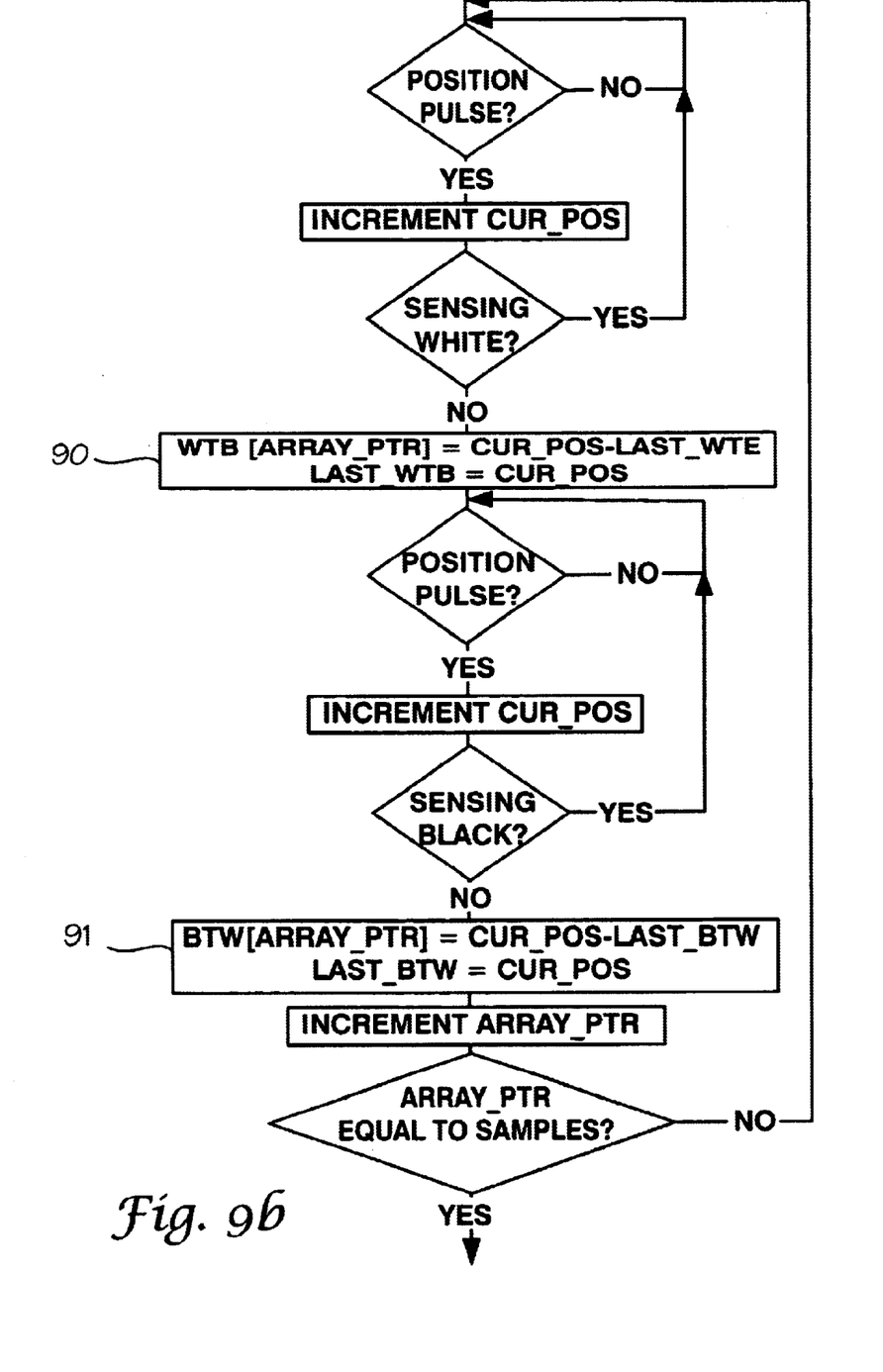
FIG. 9b illustrates a top-level flowchart depicting the logical determination of the directional rotation of the turntable, (Part B)
Figure 9C:
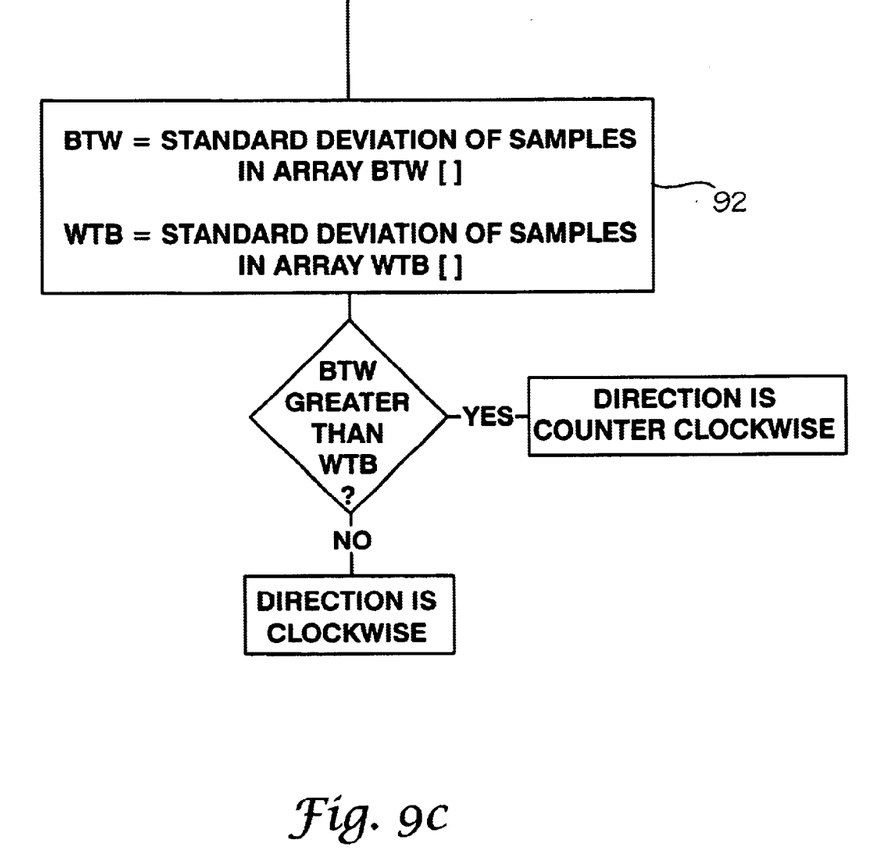
FIG. 9c illustrates a top-level flowchart depicting the logical determination of the directional rotation of the turntable, (Part C).

A logical determination of the direction of rotation 82, FIG. 9a of the turntable 12, FIG. 2a: The bit-cells of the annular indicia 18, FIG. 3 are continuously read and interpreted by the micro-controller 19. The interpretation of the determination of the direction of rotation 82 is derived from the recognition and calculation of the bit-cells. For example, the recognition of bit-cells begins by the micro-controller 19 measuring the width of the segment transitions from a white to black to the next white to black segment 83. The width of the transitions from a black to white to the next black to white is also measured. Upon detecting the white to black transition, the array pointer (array_ptr) 84 and current position (cur_pos) 85 variables are set to zero, and the position of the last white to black transition (last_wtb) 86 is also set to zero. A positional pulse 87 signifies a positional change of a selected amount in the turntable's 12 rotation. The determination of the positional pulse 87 is derived from the desired number of bit-cells of the annular indicia 18, i.e., derived from the AC line frequency as discussed herein. When the positional pulse is detected, the current position variable 85 is incremented thereby recording the degree of rotation of the turntable 12. If the micro-controller 19 is still sensing black 89, the micro-controller 19 waits for another positional change 87. Once a transition from black to white is detected, the variable last black to white (last_btw) 93 is set to the value of the current position. As color transitions are detected, the difference in position between the current white to black transition and the last white to black transition detected is stored in the array white to black (wtb[ ]) 90, FIG. 9b. The same type of information concerning the black to white transition is stored in the black to white array (btw[ ]) 91. Once a selected number of samples of widths of the transitions have been stored, the standard deviation of the samples in both arrays is calculated. The results of the standard deviation calculations are compared 92, FIG. 9c. If the black to white transitions are more irregular than the white to black transitions, then the standard deviation of the contents of the array btw[ ] will be greater than the standard deviation of the contents of the array wtb[ ], therefore; the turntable 12 is deemed to rotate counterclockwise. Conversely, if the black to white transitions are more regular than the white to black transitions, then the standard deviation of the contents of the array btw[ ] will be less than the standard deviation of the contents of the array wtb[ ], therefore; the turntable is deemed to rotate clockwise.

Figure 4A:
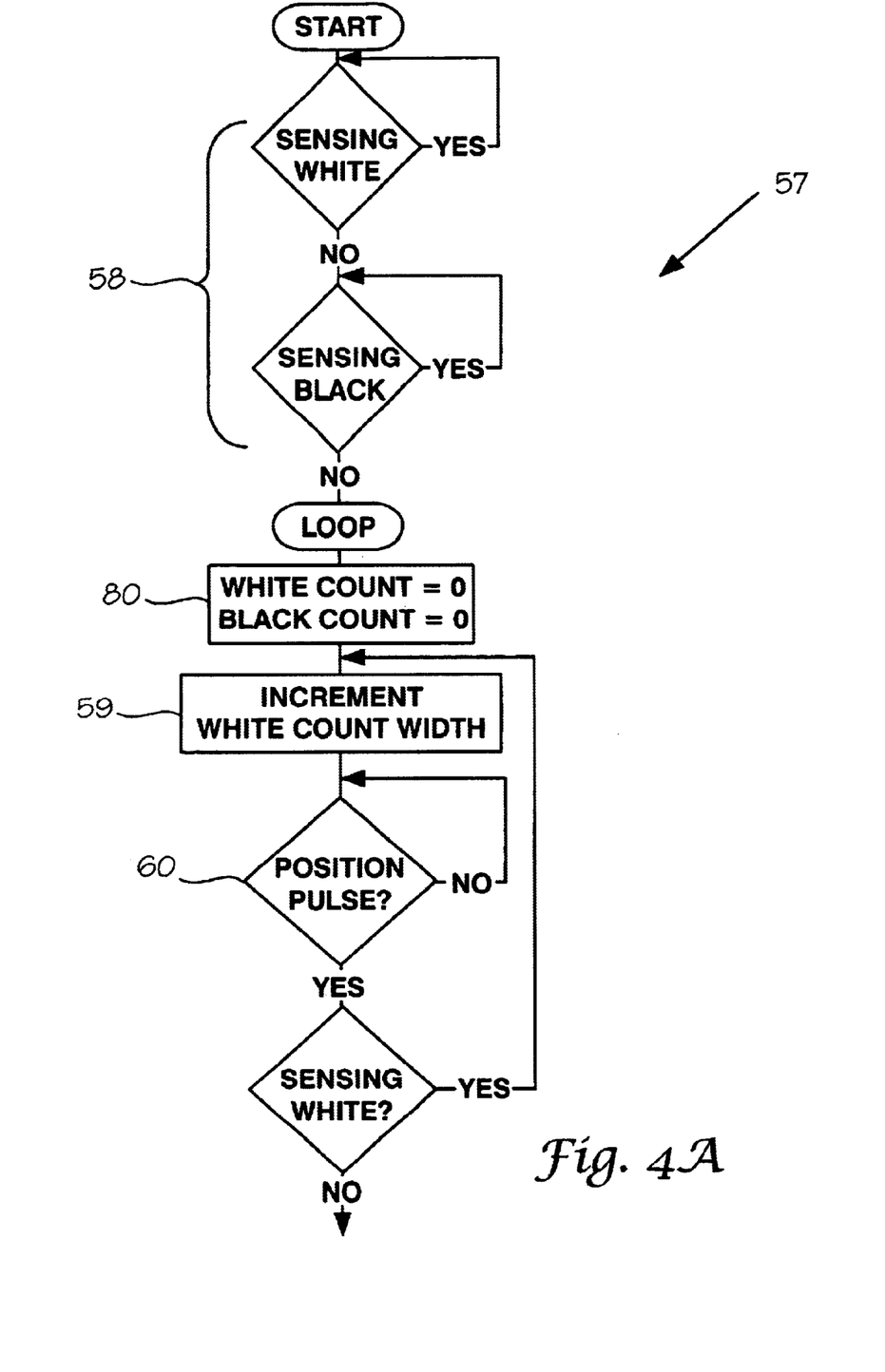
FIG. 4a illustrates a top-level flowchart depicting the logical determination of the binary value of a bit-cell relative to the clockwise rotation of the turntable, (Part A)
Figure 4B:
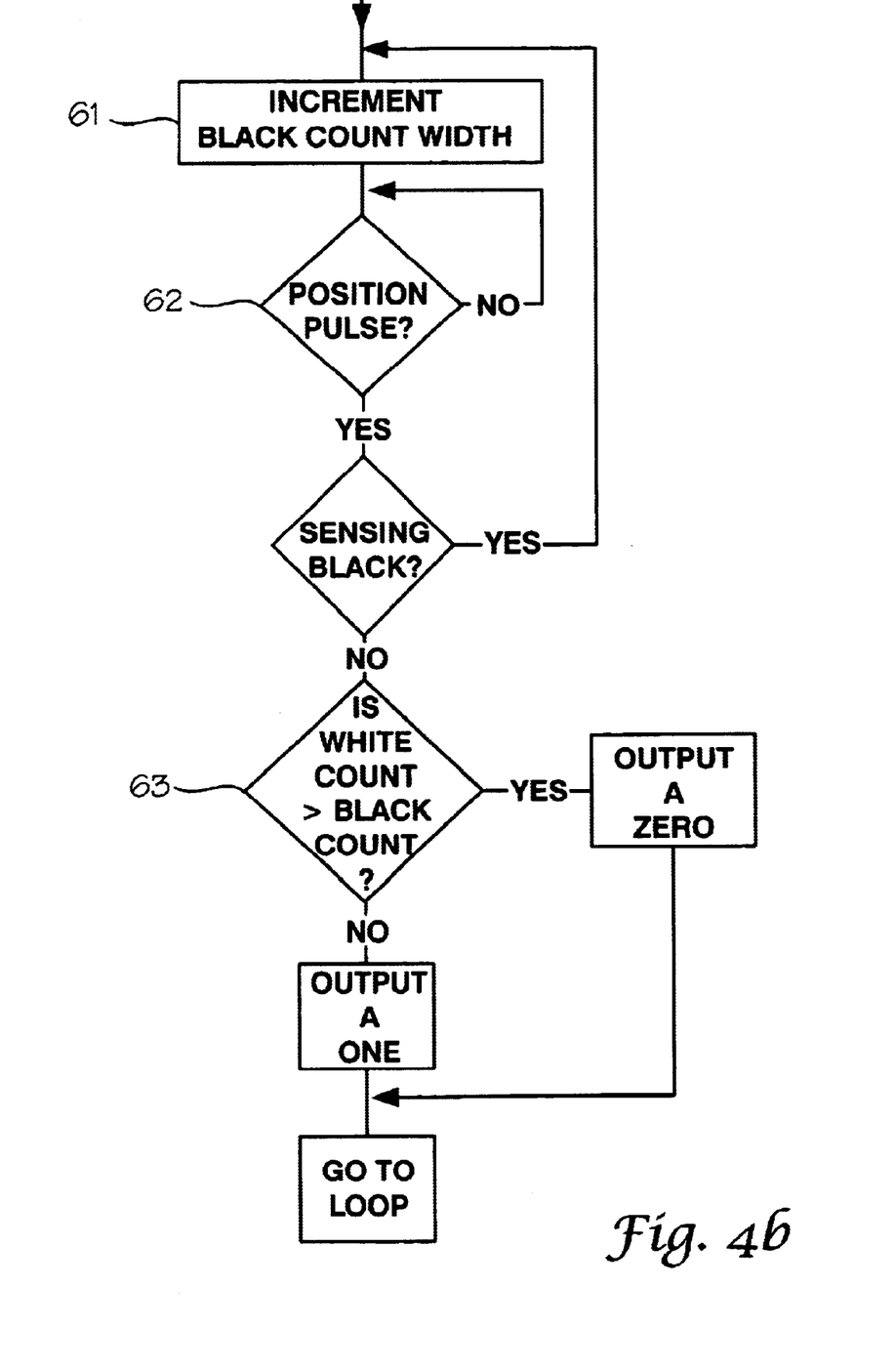
FIG. 4b illustrates a top-level flowchart depicting the logical determination of the binary value of a bit-cell relative to the clockwise rotation of the turntable, (Part B)

A logical determination of the binary value of a bit-cell relative to the clockwise rotation of the turntable, FIG. 4a: The binary value of a bit-cell 57 is a flowchart of logical expression that may, if desired, be transformed into software or program code for storage and implementation by the micro-controller 19. A black to white transition is determined 58 indicating a clockwise rotation of the turntable 12. Subsequently, the white and black width counters 80 are set to zero. With the occurrence of the position pulse 60 and the detection of a white bit-cell by the photo-transceiver 21, the white width count 59 is incremented. If a white symbol is continually detected, the white width count 59 is continually incremented until a black symbol is detected. With the occurrence of the position pulse 62 and the detection of a black symbol by the photo-transceiver 21, the black width count 61 is incremented. If a black symbol is continually detected, the black width count 80 is continually incremented until a white symbol is detected. When a transition from black to white is detected, the white width count and the black width count are compared. If the white symbol count is greater than the black symbol count 63, the value of the read bit-cell is a binary zero. If the black symbol count is greater than the white bit-cell count 63, the value of the read bit-cell is a binary one.

Figure 5A:
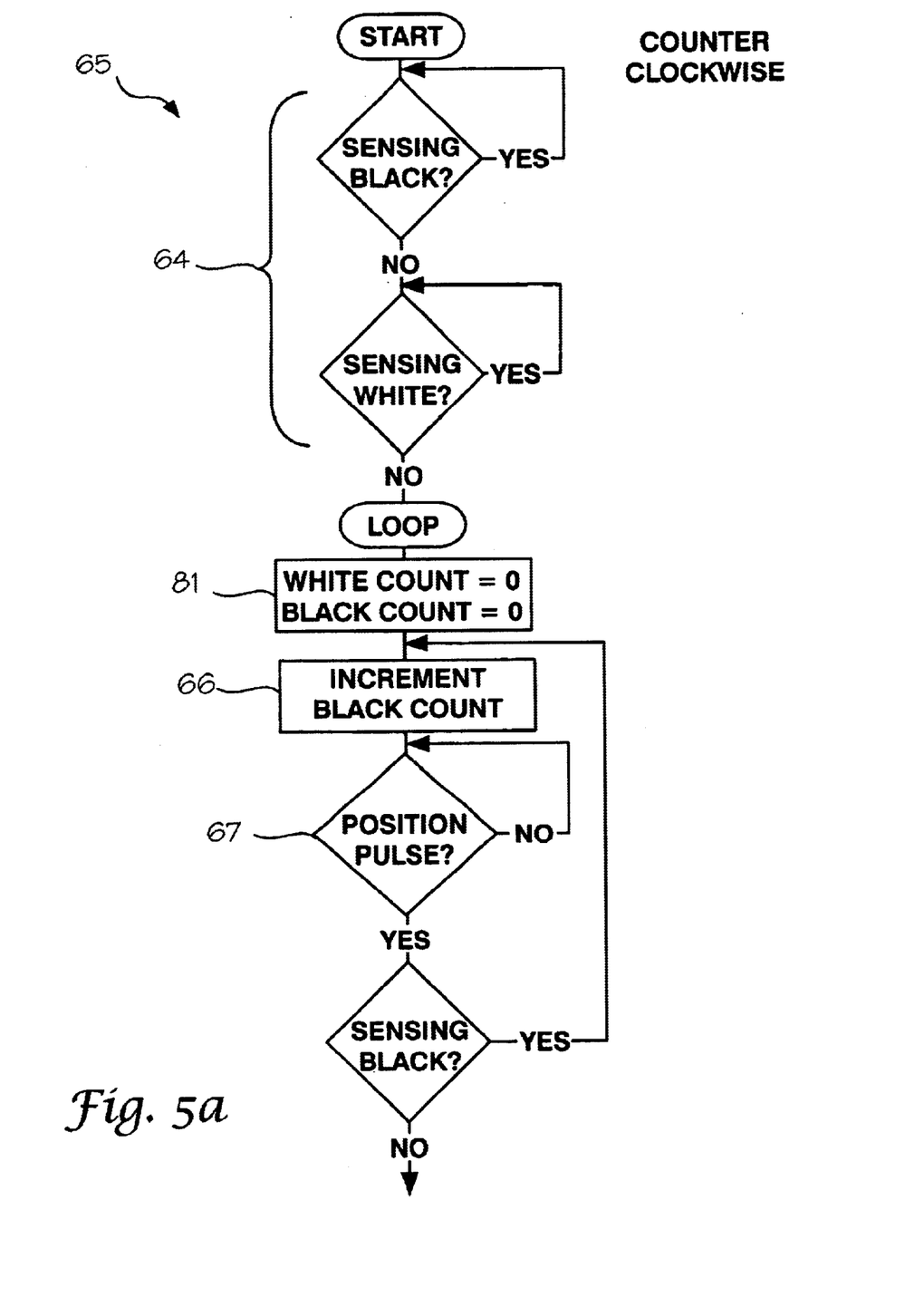
FIG. 5a illustrates a top-level flowchart depicting the logical determination of the binary value of a bit-cell relative to the counterclockwise rotation of the turntable, (Part A)
Figure 5B:
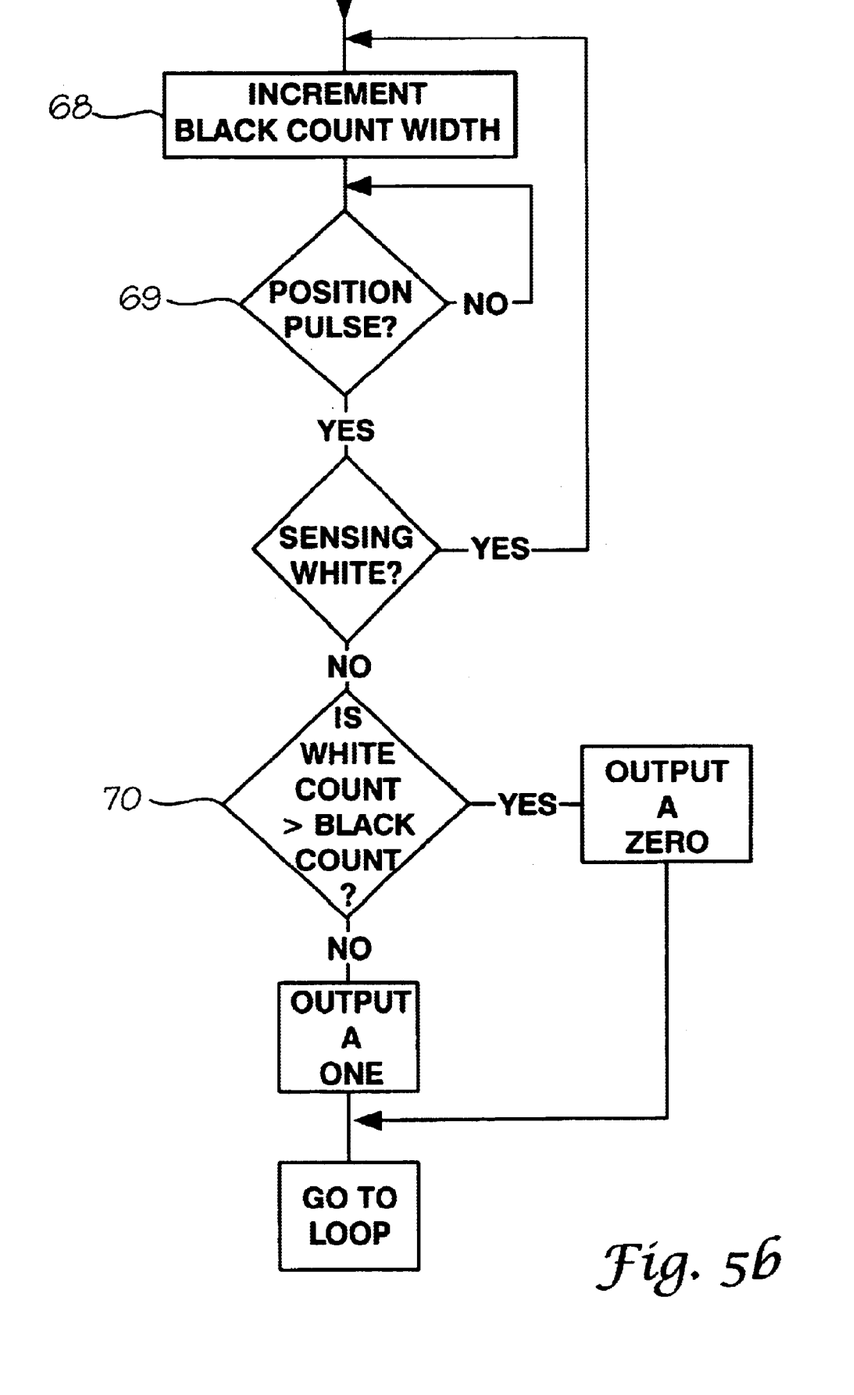
FIG. 5b illustrates a top-level flowchart depicting the logical determination of the binary value of a bit-cell relative to the counterclockwise rotation of the turntable, (Part B)

A logical determination of the binary value of a bit-cell relative to the counterclockwise rotation of the turntable, FIG. 5a counterclockwise direction: The binary value of a bit-cell 65 is a flowchart of logical expression that may, if desired, be transformed into software or program code for storage and implementation by micro-controller 19. A white to black transition is determined 64 indicating a counterclockwise rotation of the turntable 12. Subsequently, the white and black width counters 81 are set to zero. With the occurrence of the position pulse 67 and the detection of a black symbol by the photo-transceiver 21, the black width count 66 is incremented. If a black symbol is continually detected, the black width count 66 is continually incremented until a white symbol is detected. With the occurrence of the position pulse 67 and the detection of a white symbol by the photo-transceiver 21, the white width count 81 is incremented. If a white symbol is continually detected, the white width count 81 is continually incremented until a black symbol is detected. When a transition from the white to black is detected, the white width count and the black width count are compared. If the black bit-cell count is greater than the white symbol count 81, the value of the read bit-cell is a binary one. If the white symbol count is greater than the black symbol count 70, the value of the read bit-cell is a binary zero.

Figure 7:
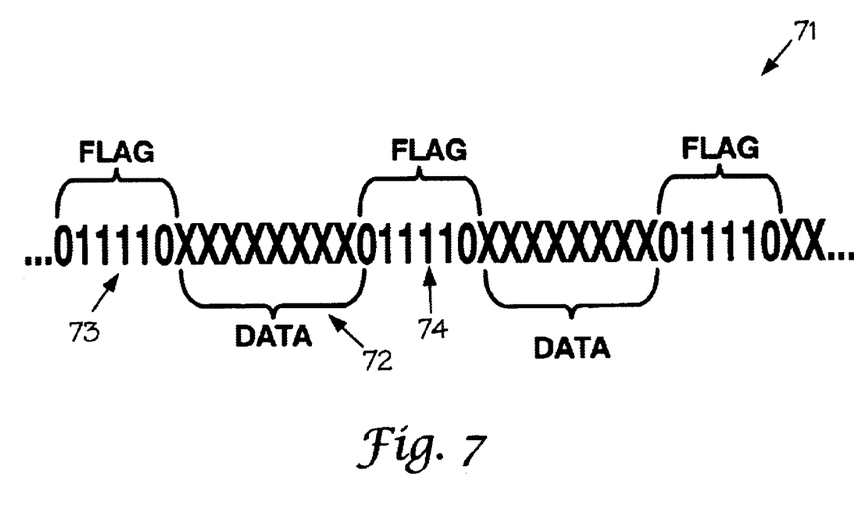
FIG. 7 illustrates a linear representation schematic diagram expressed in binary of a linear representation schematic diagram of FIG. 6.

After the directional rotation of the turntable 12, FIG. 2a is determined, the interpretation of the data contained in the annular indicia 18, FIG. 3 is determined. The width of each bit-cell is ascertained and the binary value of each bit-cell is determined (as discussed above). The coding format 71, FIG. 7 is presented in a linear format for the benefit of the reader. The annular indicia 18 is circular and the bit-cells contained thereon are imprinted in a like circular fashion. Any convenient number of bit-cells may, if desired, be imprinted on the annular indicia 18. The encoded data segment 72, FIG. 7 is positioned between two oppositely disposed flag indicators 73 and 74 respectively. Each flag indicator 73 and 74 contains four binary ones indicating the start and stop of the data segment 72. This pattern of flag indicators 73 and 74 and data segments 72 may, if desired, be repeated around the annular indicia 18. The data segments may, if desired, be the same repeating data or the data segments may be different depending on the desired information to be conveyed to the micro-controller 19. The length of the data segments between any two flag indicators may be any desired length. For example, FIG. 7 illustrates eight binary interpretations of bit-cells but the length of the data segment 72 may contain any convenient number of bit-cells.

Figure 8:
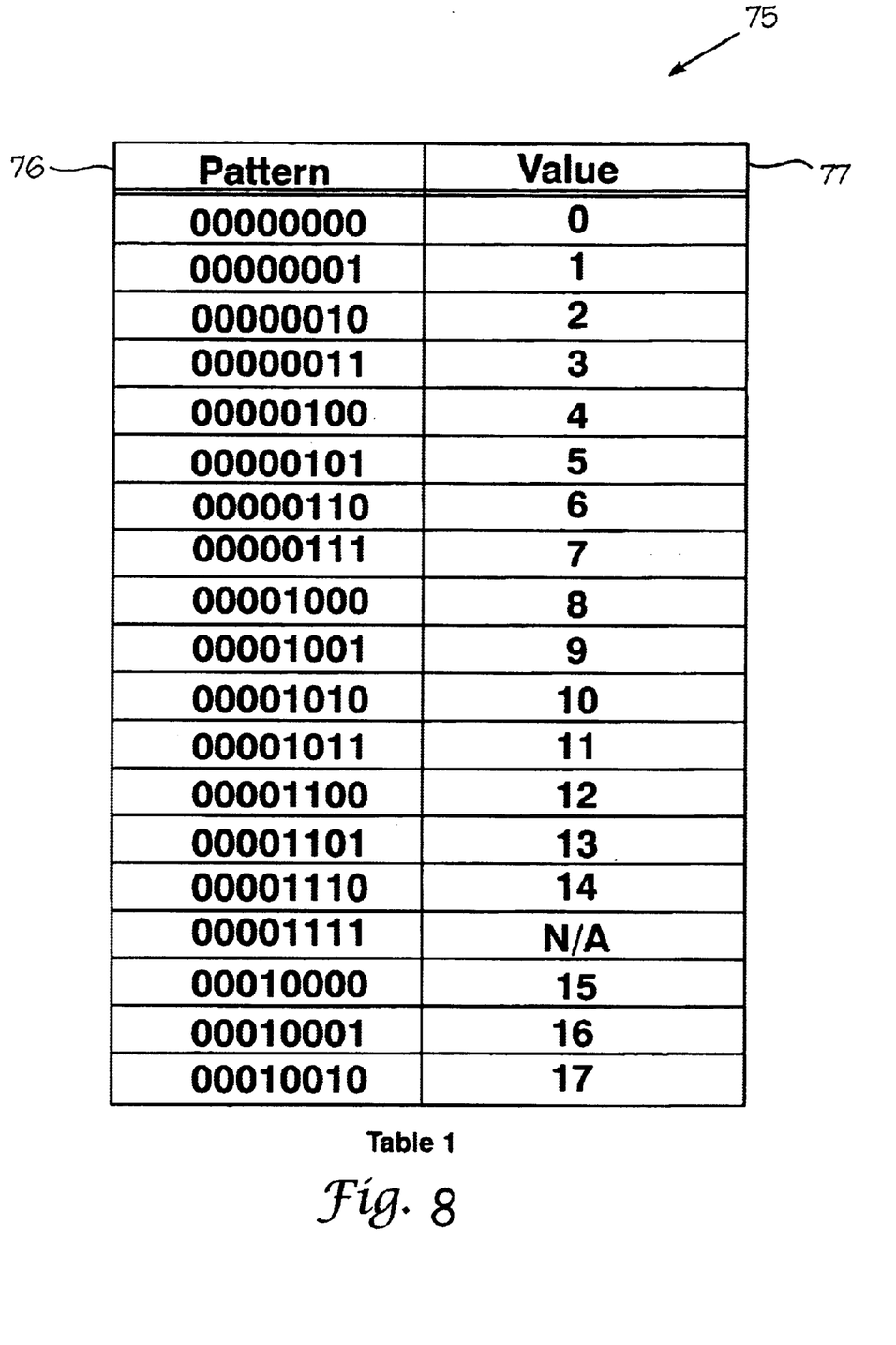
FIG. 8 illustrates Table 1 depicting values assigned to bit-cell interpretation.

The interpretation of the data segments by the micro-controller 19 is presented in Table 1, FIG. 8. A predetermined pattern or predetermined code 76 follows techniques well known in the art of listing or representing binary numbers. Each predetermined code 76 is assigned a unique value 77. The predetermined code 76, delineating the four repeating or consecutive binary ones, is not used for data interpretation. The repeating four binary ones are reserved for flag indicators.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claim, means-plus-function clause is intended to cover the structures described herein as performing the recited function and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

We claim:

1. An apparatus for interpreting data from the surface of a geometrically shaped object, the object being disposed on a synchronistically rotatable platform operationally disposed to a controller with memory, the apparatus comprising:
   a) an annular indicia imprinted on the surface of the object;
   b) said annular indicia having disposed thereon at least one pair of bit-cells;
   c) a program stored in memory, said program having a plurality of interactive data structures comprising:
      b) a receiving data structure, said receiving data structure receiving said bit-cells;
      c) a synchronistic data structure, said synchronistic data structure determining the directional rotation of the object from said received bit-cells; and
      d) an interpreting data structure in cooperation with said synchronistic data structure transforming said receiving data structure into controller readable data.

2. An apparatus for interpreting data as recited in claim 1 wherein said interpreting data structure transforms said receiving data structure subsequent to receiving determined direction rotation information.

3. An apparatus for interpreting data as recited in claim 2 wherein said data annotated on said annular indicia is medially disposed to selective repeating bit-cells.

4. An apparatus for interpreting data as recited in claim 3 wherein said annotated symbols being white or black.

5. An apparatus for interpreting data as recited in claim 4 wherein said annular indicia's bit-cells being a fixed angular width.

6. An apparatus for interpreting synchronous data as recited in claim 5 wherein said fixed angular width is an integer derived from dividing 360° (degrees) by the selected number of bit-cells.

7. An apparatus for interpreting data as recited in claim 6 wherein each said annular indicia's bit cell containing at least two annotated symbols of dissimilarly angular width.

8. An apparatus for interpreting data as recited in claim 7 wherein said annotated symbols being substantially trapezoidally shaped.

9. An apparatus for interpreting data as recited in claim 8 wherein said synchronistic data structure being responsive to rotational determination.

10. An apparatus for interpreting data as recited in claim 9 wherein said determined directional rotation is clockwise.

11. An apparatus for interpreting data as recited in claim 10 wherein said determined directional rotation is counterclockwise.

12. An apparatus for interpreting data as recited in claim 11 wherein said annular indicia being imprinted on the surface of an object to receive work, the object being disposed within the confines of a microwave oven or physical, chemical, or thermodynamic process stream.

* * * * *

UNITED STATES PATENT AND TRADEMARK OFFICE
CERTIFICATE OF CORRECTION

PATENT NO. : 6,698,657 B2
DATED : March 5, 2003
INVENTOR(S) : Victor A. Murphy and John T. Dunlap It is certified that error appears in the above-identified patent and that said Letters Patent is hereby corrected as shown below:

<u>Title page</u>,
Item [75], Inventors, should be -- Victor A. Murphy and John T. Dunlap --.

Signed and Sealed this

Eleventh Day of May, 2004

JON W. DUDAS
*Acting Director of the United States Patent and Trademark Office*